(12) United States Patent
Young (10) Patent No.: US 11,179,666 B1
(45) Date of Patent: Nov. 23, 2021

(54) SYSTEMS AND METHODS FOR REMOVAL OF POLLUTANTS (71) Applicant: Larry Young, Los Angeles, CA (US)

(72) Inventor: Larry Young, Los Angeles, CA (US)

(*) Notice: Subject to any disclaimer, the term of this patent is extended or adjusted under 35 U.S.C. 154(b) by 0 days.

(21) Appl. No.: 17/224,232

(22) Filed: Apr. 7, 2021

(51) Int. Cl.
| B01D 47/06 | (2006.01) |
| F23J 15/04 | (2006.01) |
| B01D 49/00 | (2006.01) |
| B01D 39/20 | (2006.01) |
| B64D 47/00 | (2006.01) |
| B64D 1/22 | (2006.01) |
| A62C 3/02 | (2006.01) |
| F23J 15/02 | (2006.01) |

(52) U.S. Cl.
CPC ......... *B01D 47/06* (2013.01); *B01D 39/2068* (2013.01); *B01D 49/00* (2013.01); *F23J 15/04* (2013.01); *A62C 3/0207* (2013.01); *B01D 2258/06* (2013.01); *B01D 2259/4558* (2013.01); *B01D 2279/40* (2013.01); *B64D 1/22* (2013.01); *B64D 47/00* (2013.01); *F23J 15/022* (2013.01)

(58) Field of Classification Search
CPC ............... B01D 49/00; B01D 39/2068; B01D 2279/40; B01D 2258/06; B01D 2259/4558; B64D 47/00; B64D 1/22; B64C 39/0207; B64C 39/0228; B64C 39/024; B64C 2201/027; B64C 2201/12; B64C 2201/146
See application file for complete search history.

(56) References Cited

U.S. PATENT DOCUMENTS

| 3,923,956 | A  | * | 12/1975 | Bowman | F23G 7/065 |
| | | | | | 423/210 |
| 2003/0145733 | A1 | * | 8/2003 | Martinez | B01D 47/16 |
| | | | | | 96/281 |
| 2012/0111845 | A1 | * | 5/2012 | Simms | B08B 15/04 |
| | | | | | 219/137 R |
| 2020/0289973 | A1 | * | 9/2020 | Salehpoor | B01D 53/145 |

FOREIGN PATENT DOCUMENTS

CN 101358746 A * 2/2009 .......... F24C 15/2085

OTHER PUBLICATIONS

CN101358746A_ENG (Espacenet machine translation of Hu) (Year: 2009).*

* cited by examiner

Primary Examiner — Jonathan Miller
Assistant Examiner — Gabriel E Gitman
(74) Attorney, Agent, or Firm — Daniel M. Cohn; Howard M. Cohn (57) ABSTRACT A system for the removal of gaseous pollutants including smoke, exhaust and other gases that are released into the atmosphere, comprises means for enclosing the gaseous pollutants that are released into the atmosphere and for transporting them through tubing and ductwork. Means for filtering the gaseous pollutants through a filtration system and then mixing the gaseous pollutants exiting the filtration system with steam. Means for cooling the gaseous pollutants mixed with steam exiting the filtration system with a mist to convert the pollutants being cooled from a gaseous state to a liquid state, while concurrently disposing of the smoke, exhaust, liquid and solid particulates that are in the pollutants.

18 Claims, 8 Drawing Sheets

SECTION B-B

SYSTEMS AND METHODS FOR REMOVAL OF POLLUTANTS

FIELD OF THE INVENTION

The present invention relates to systems and methods for capturing and removal of pollutants in the atmosphere, and more particularly, to systems and methods for capturing and removing smoke, exhaust, and pollutants that are emitted into the atmosphere.

BACKGROUND OF THE INVENTION

The ozone layer is being depleted due to pollution and this is a major factor in global warming. Pollution is contamination of the air. Some of the top air pollutants are smoke, smog, soot, and greenhouse gases. The particles in these pollutants are also known as particulate matter. Air pollution comes in the form of gases, water vapor and aerosols. Usually, these pollutants can only be detected by the visible eye in the form of smoke or exhaust. Smoke is a by-product of fires and its composition depends on what is being burnt. It is a product of combustion with air consisting of carbon carried by hot gases and clouds of fine particles suspended in gases. These hot gases are lighter than the air surrounding them. This causes these hot gases to rise in the atmosphere. The components of these pollutants also contain other gaseous air pollutants, such as hydrocarbon, nitrogen oxides, carbon monoxide, and more. In industry, smoke is an agent of pollution due to burning of fossil fuels in power plants, smokestacks, refineries, factories, industries, and other sources.

One of the major contributors to pollution through natural disasters is fires. Wildfires and forest fires are fires of combustible vegetation in rural areas. Another contributor to pollution is smog. It is emitted into the atmosphere from the combustion of fossil fuels with sunlight. Natural causes of pollution are when volcanoes emit water vapor, smoke, and toxic gases into the atmosphere when they erupt. The pollutants from these effects have always been released into the atmosphere, whether from fires, volcano eruption, smog, or other causes when they occur. There has never been a known way to trap these pollutants from emitting into the atmosphere.

It is common for fire extinguishing material to be dispersed from airplanes or helicopters onto forest fires, or other types of conflagration, particularly where fire fighters cannot reach the site on the ground. In some instances, the material is sprayed onto the fire from the plane and, in other cases, bombs or other projectiles filled with fire quenching compounds are dropped directly into the fire, the device distributing its contents upon impact with the ground.

Some of the problems with the prior art aerial extinguishers include the fact that they are very complicated and bulky and do not ensure that the fire extinguishing material can be adequately dispersed. That is particularly true of the type of aerial bomb that is to release its contents above the fire when the downward flight of the bomb is retarded.

Air pollution is a major environmental challenge causing tangible health, economic and climatic effects. In many developing regions of the world, emissions are increasing rapidly and are set to rise dramatically in the next century if the conventional development path is followed. Industrialized countries take these concerns more seriously and concerted efforts are made to reduce air pollution.

Mercury is a toxic environmental pollutant that is among the most highly bio-magnified and bio-accumulated trace metal in the human food chain. Mercury comes from a range of natural sources such as volcanoes, soils, undersea vents, mercury-rich geological zones and forest fires, as well as from freshwater lakes, rivers and the oceans. However, human activity has increased the amounting of mercury in the environment in several ways, including through a variety of combustion and industrial processes like coal-fired power generation, metal mining and smelting and waste incineration.

Carbon dioxide ($CO_2$), methane ($CH_4$), nitrous oxide ($N_2O$) and various halocarbons are known to be important participant gases to greenhouse emissions.

Concerns are raised also about other pollutants and greenhouse gas co-pollutants such as nitrogen oxides ($NO_x$), sulfur oxides ($SO_x$), volatile organic compounds 4 3f (VOC) as well as particulate matter (aerosols), as sources of grave environmental problems.

Several techniques are known to reduce the emission of these pollutants. Adsorption is one technique used, but most known adsorbents are efficient at a relatively low temperature and become often less useful when used at high temperature, when the undesired compounds are released.

Therefore, it would be highly desirable to develop a method and an apparatus for adsorbing contaminants and/or pollutants from a hot contaminated fluid which will improve the efficiency of the adsorbent by reducing the temperature of the contaminated fluid.

It is also clear that the pollutants are not only required to be merely removed from a fluid stream, but also need to be recycled. However, the recycling techniques should be energetically efficient with minimum adverse impacts on the environment.

Hence, a complete system and method, which utilize a minimum of energy, involving (a) one or more adsorbent interface(s), (b) an efficient cooling of the polluted fluid, (c) a recycling-reusage of adsorbents, and (d) a recovery of useful materials from waste, are desirable to meet the challenges of minimizing the adverse impacts on the environment.

SUMMARY OF THE INVENTION

One embodiment of the present invention relates to systems and methods for removal of smoke, exhaust, and pollutants that are emitted into the atmosphere. The system for the removal of gaseous pollutants including smoke, exhaust and other gases that are released into the atmosphere, comprises means for enclosing the gaseous pollutants that are released into the atmosphere and for transporting them through tubing and ductwork. Means for filtering the gaseous pollutants through a filtration system and then mixing the gaseous pollutants exiting the filtration system with steam. Means for cooling the gaseous pollutants mixed with steam exiting the filtration system with a mist to convert the pollutants being cooled from a gaseous state to a liquid state, while concurrently disposing of the smoke, exhaust, liquid and solid particulates that are in the pollutants.

In an exemplary embodiment, the present invention may be used to remove smoke, exhaust, and pollutants that are released into the atmosphere by natural causes and disasters by: (a) trapping the pollutants; (b) sucking the trapped gases through a vacuum system; (c) venting the pollutants through a filter system; (d) mixing the gases with steam in a mixing chamber; (e) cooling the gases and steam with mist from water in a mixing chamber; (f) releasing the mist into the atmosphere and draining the liquids.

These and other objects and advantages of the invention will become apparent from the following description and from the accompanying drawings which illustrate one embodiment of the invention.

BRIEF DESCRIPTION OF THE DRAWINGS

The structure, operation, and advantages of the present invention will become further apparent upon consideration of the following description taken in conjunction with the accompanying figures (FIGS.). The figures are intended to be illustrative, not limiting. Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

In the drawings accompanying the description that follows, both reference numerals and legends (labels, text descriptions) may be used to identify elements. If legends are provided, they are intended merely as an aid to the reader, and should not in any way be interpreted as limiting.

DETAILED DESCRIPTION OF THE PREFERRED EMBODIMENTS

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader, and should not in any way be interpreted as limiting.

At present, various firefighting devices and apparatus are known in the state of the art. More specifically, the use of aerial means and aircraft is currently recognized as an effective solution for extinguishing forest fires. Forest fires have caused serious consequences in the United States in recent years, both to people and their properties, and the environment. The environmental, and financial consequences of these forest fires have been extremely detrimental.

Further, smoke ventilation remains a major problem with fires. The current invention seeks to provide a remedy to these issues.

The present invention resolves the aforementioned drawbacks providing an air-transported fire extinguishing device, which makes it possible to substantially increase the efficiency and performance of the aerial means when extinguishing fires, whether forest, industrial or urban fires, and whereby it is possible to reduce both the time used in putting out the fire, and the economic costs arising from the entire extinguishing process, from when the voice of alarm is received until the fire has been totally controlled.

The fire extinguishing device object of the invention is intended to initially remain located inside a helicopter or aerial means concerned, wherein there is also a water tank and at least one reel linked to the tank.

Further, smoke ventilation remains a major problem with fires. The current invention seeks to provide a remedy to these issues.

The present invention resolves the aforementioned drawbacks providing an air-transported fire extinguishing device, which makes it possible to substantially increase the efficiency and performance of the aerial means when extinguishing fires, whether forest, industrial or urban fires, and whereby it is possible to reduce both the time used in putting out the fire, and the economic costs arising from the entire extinguishing process, from when the voice of alarm is received until the fire has been totally controlled.

The fire extinguishing device object of the invention is intended to initially remain located inside a helicopter or aerial means concerned, wherein there is also a water tank and at least one reel linked to the tank.

The current invention seeks to provide ventilation techniques to be used in firefighting to control the movement of air and smoke as well as hot, flammable or hazardous gases. Proper ventilation can serve many purposes. For example, with small fires, ventilation can exhaust smoke to minimize smoke damage to property. With larger, more serious fires, exhausting smoke can reduce the risk of personal injury to both firefighters and occupants of the burning structure. Proper ventilation can remove hot air and combustible gases, thus slowing the spread of the fire. Even in "non-fire" emergencies, ventilation can remove toxic and/or flammable gases arising from various sources.

Figure 1:
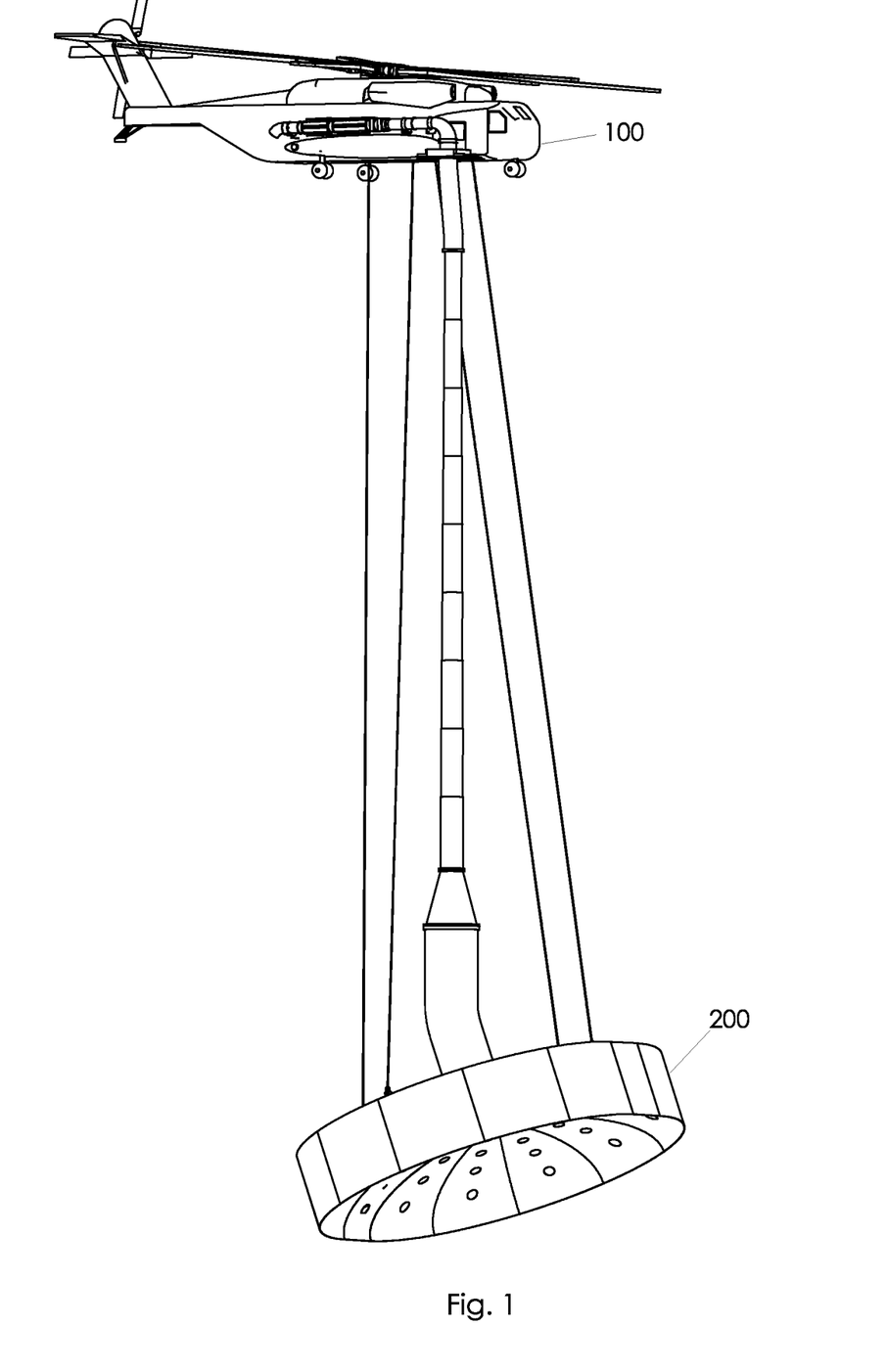
FIG. 1 is a three-dimensional view of a transport unit having an exhaust hood secured thereto, in accordance with the present invention.
Figure 2:
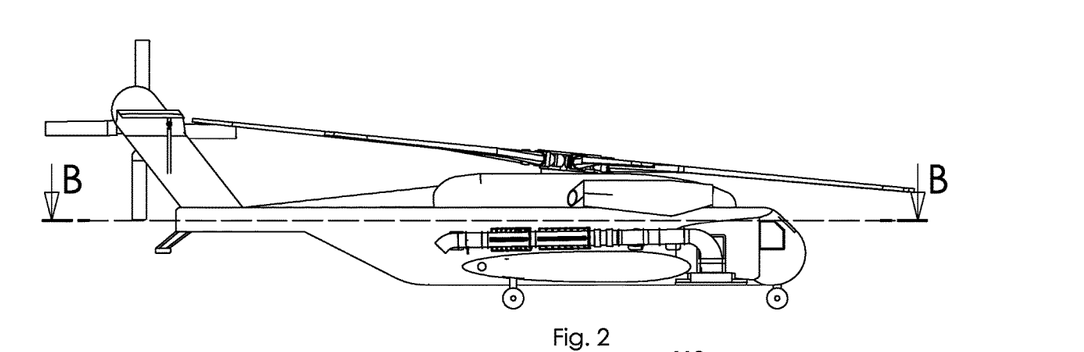
FIG. 2 is a side view of a transport unit, in accordance with the present invention.
Figure 3:
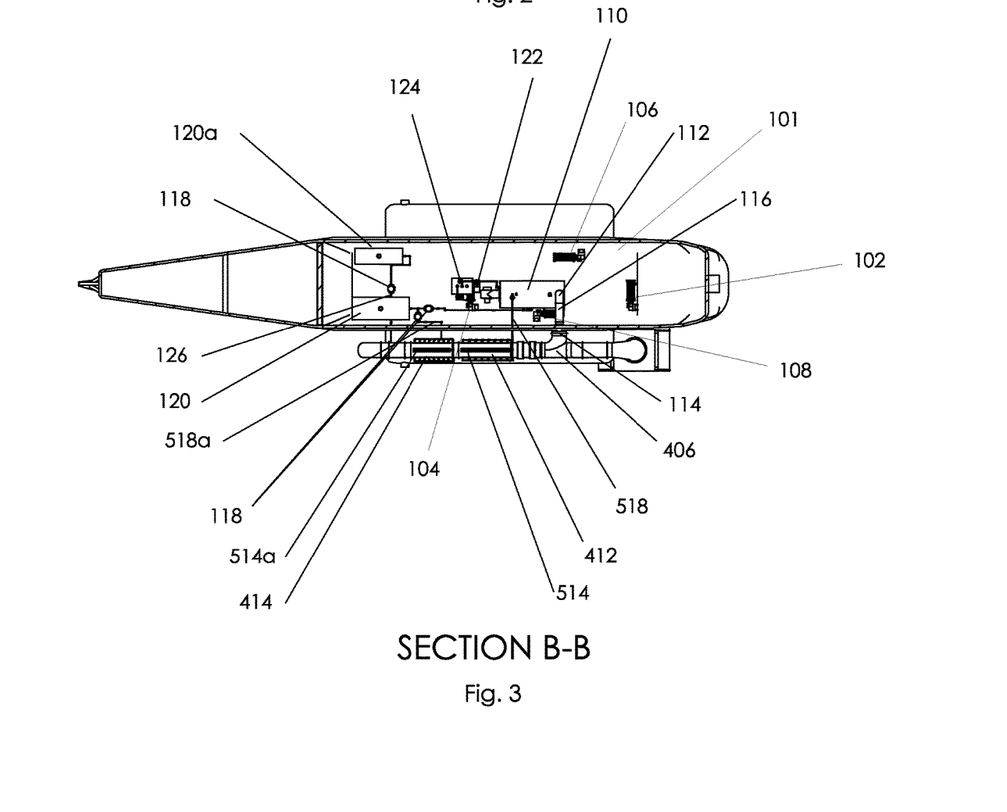
FIG. 3 is a view through B-B of FIG. 2, in accordance with the present invention.

In a preferred embodiment, as shown in FIG. 1, a transport unit 100 will transport an exhaust hood 200 to remove smoke, exhaust, and pollutants that are released into the atmosphere by natural causes and disasters. The transport unit 100 will be a special equipped helicopter or drone equipped to transport heavy loads and having a large cargo area. As shown in FIG. 3, inside the transport unit 100 is a cabin area 101 having four winches 102, 104, 106, 108 with cables, hooks and motors with controls mounting therein. Winch 102 will be located in the front and center of the cabin 101. Winch 104 will be aligned with winch 102 and positioned around 20 ft. in back of it. Winch 106 and winch 108 will be located toward the middle and on each side of the cabin 101 and aligned with each other.

Figure 4:
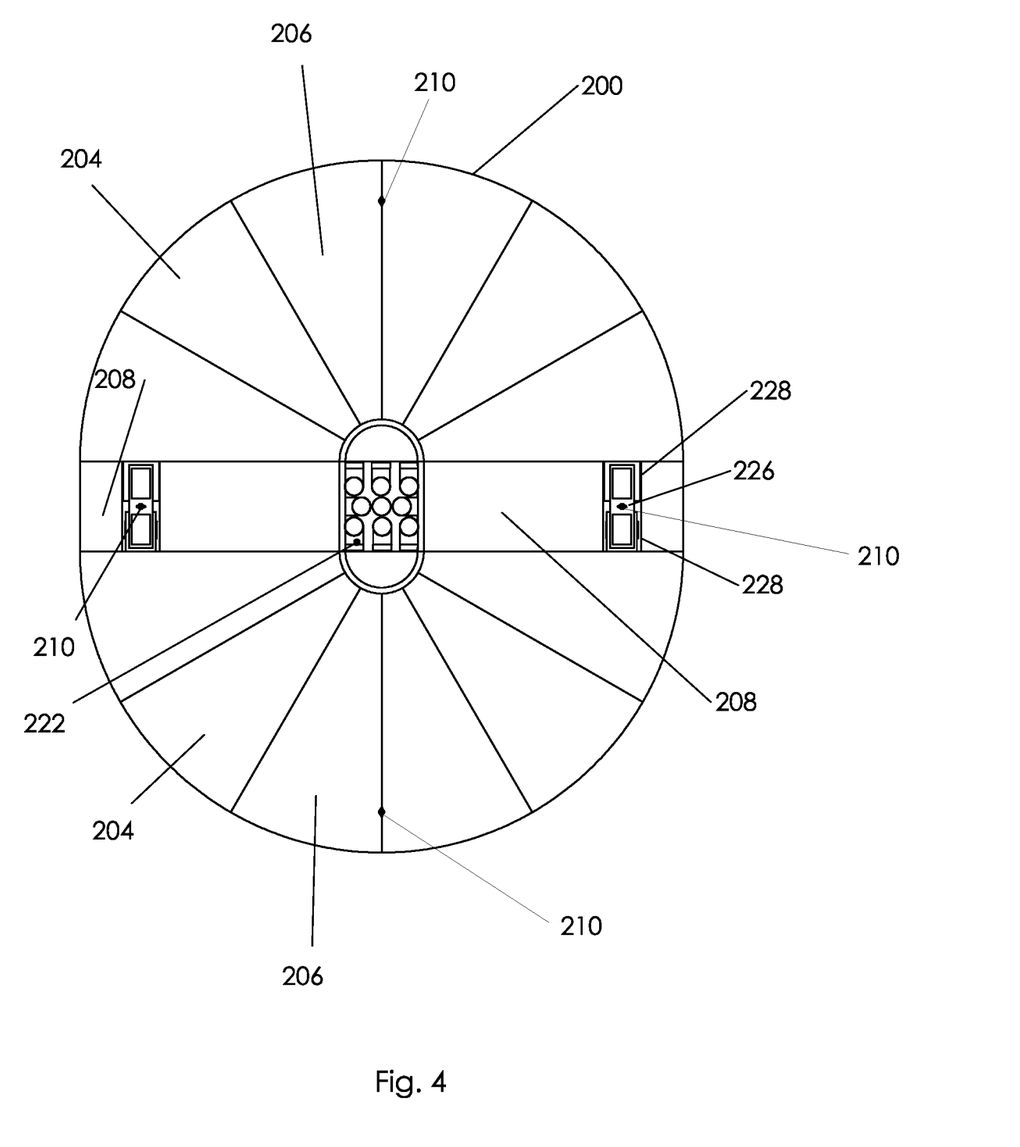
FIG. 4 is a top view of an exhaust hood, in accordance with the present invention.

The hooks from winches 102, 104, 106, and 108 are attached to four host rings 210 on exhaust hood 200, as shown on FIG. 4. Winch 102 is connected to the left side of the exhaust hood 200 and winch 104 is connected to the right side of the exhaust hood. Winch 106 and winch 108 are connected on the top and bottom sides of the exhaust hood 200.

Figure 5:
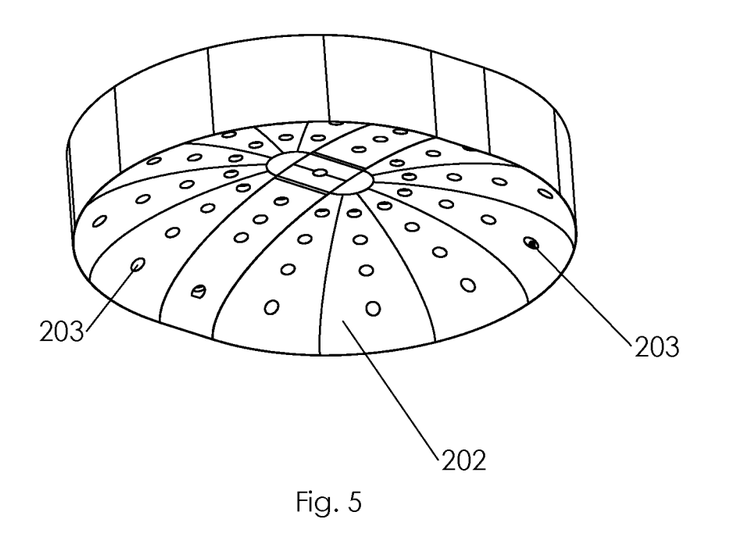
FIG. 5 is a three-dimensional bottom view of the exhaust hood of FIG. 4, in accordance with the present invention.
Figure 6:
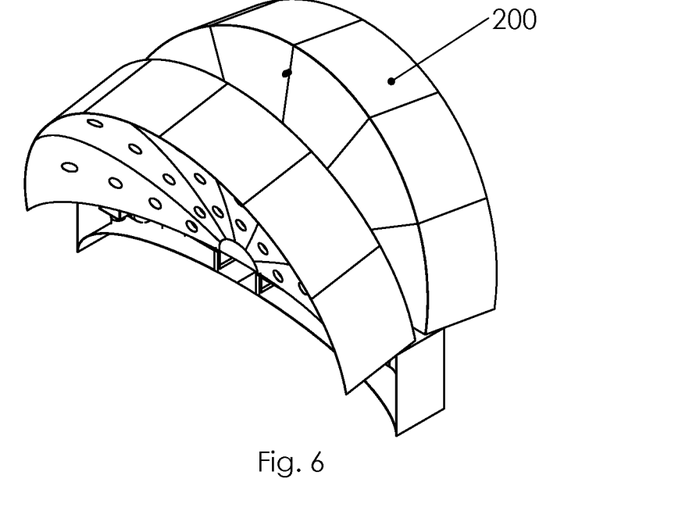
FIG. 6 is a three-dimensional view of exhaust hood in a folded position, in accordance with the present invention.

FIG. 5 is a bottom view of exhaust hood 200. The bottom, exterior area of exhaust hood 200 forms a dome 202. Dome 202 has cut outs 203 into which are mounted tubing 212, 214, 216, 218, as shown in FIG. 7.

Figure 7:
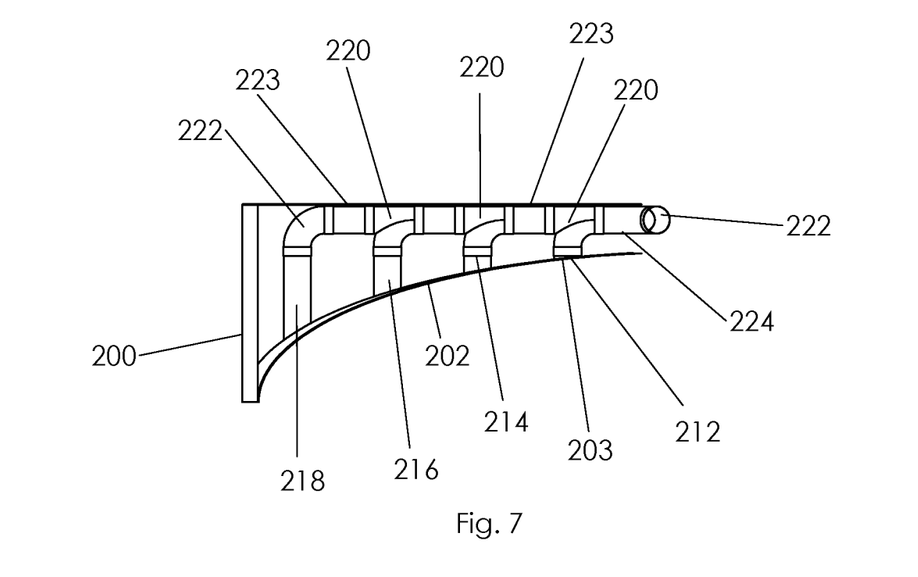
FIG. 7 is a side view, partly in cross section, of a portion of the exhaust hood in accordance with the present invention.

Referring to FIG. 7, there is shown a sectional view of exhaust hood 200 showing the interior of exhaust hood 200. Tubes 212, 214, 216, 218 are secured over each cut-out opening 203 of dome 202. Three y-elbows 220 are secured over tubes 212, 214, and 216. One elbow 222 is secured over tube 218. Tubing 223 connects the two y-elbows 220. The first y-elbow 220 is connected to tube 224. Tube 224 is connected to a second elbow 222.

Referring to FIG. 4 there is shown a top view of exhaust hood 200. At the center of exhaust hood 200 another nine elbows 222, as shown in FIG. 7, come out at the top of exhaust hood 200 from connections to the tubes 224. Twelve hoods 204, as shown in FIG. 4, are assembled to exhaust hood 200 on its two end sides. Therefore, six hoods 204 make half hood-cylinders 206 on the top side and six hoods 204 make the half hood-cylinder 206 at the bottom side.

Two hoods-middle part 208 are assembled on both inside areas of the two half hood-cylinders 206. Then, two brackets 226 are mounted on the two hoods-middle part 208. Two swivel brackets 228 are secured on both sides of each bracket 226. Both half hood-cylinders 206 are mounted to each swivel bracket 228, on both sides and ends. The four host rings 210 on exhaust hood 200 are for the hooks from winches 102, 104, 106, and 108.

Figures 9, 10:
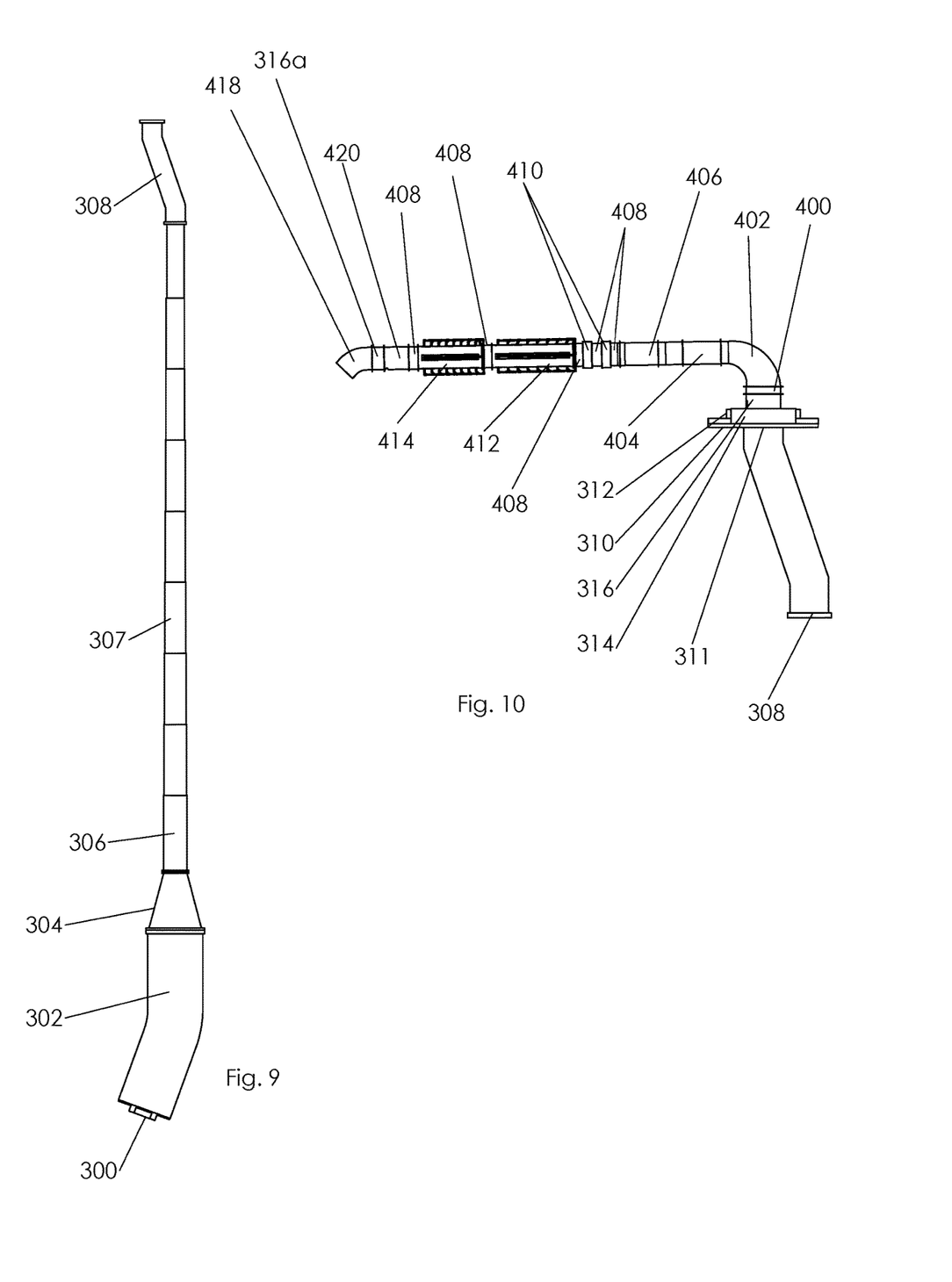
FIG. 9 is a side view of the outer tubing assemblies from the exhaust hood, in accordance with the present invention.
FIG. 10 is a side view of the outer gas and duct work assembly, in accordance with the present invention.

Mount-exhaust hood 300, as shown in FIG. 9, fits over the nine elbows 222 on exhaust hood 200, as shown in FIG. 4. Tube-bend 302 is connected to the exhaust hood mounting 300. Tube-reducer 304 connects to a tube-bend 302. Extension tubes 306 are connected to a tube-reducer 304. The extension tubes 306 consists of 9 vacuum tubes 307 that slide up and down within one another. Each tube 307 is fitted to the next tube and is fitted inside to outside.

Further, the tubes 307 are fitted from the first to the last one in sequential order. This allows extension tubes 306 to extend up and down without tubes 307 becoming detached from one another. The upper tube 308 is connected to extension tubes 306.

As shown in FIG. 10, a mounting plate 310 is the top mounting piece attached to the outer side of the transport unit 100. The mounting plate 310 will have a hole cutout 311 extending therethrough. The top end of upper tube 308 is inserted in the hole cutout 311 of the mounting plate 310. Mounting bracket 312 is positioned over the top of the hole on mounting plate 310. The mounting bracket 312 is secured over mounting plate 310. The mounting bracket 312 is secured to the free end of the upper tube 308. A fan-support 314 is fitted over mounting bracket 312. An extractor fan 316 is fitted to fan-support 314.

Referring again to FIG. 10, a connector 400 fits over the extractor fan 316. A reducer elbow 402 fits over connector 400. A duct 404 is connected to reducer elbow 402. A wye duct 406 connects to duct 404. A second duct 408 connects to wye duct 406. A filter 410 connects to a second duct 408. The second duct 408 connects to a filter 410. A second filter 410 connects to the second duct 408. A third duct 408 connects to the second filter 410.

Figure 11:
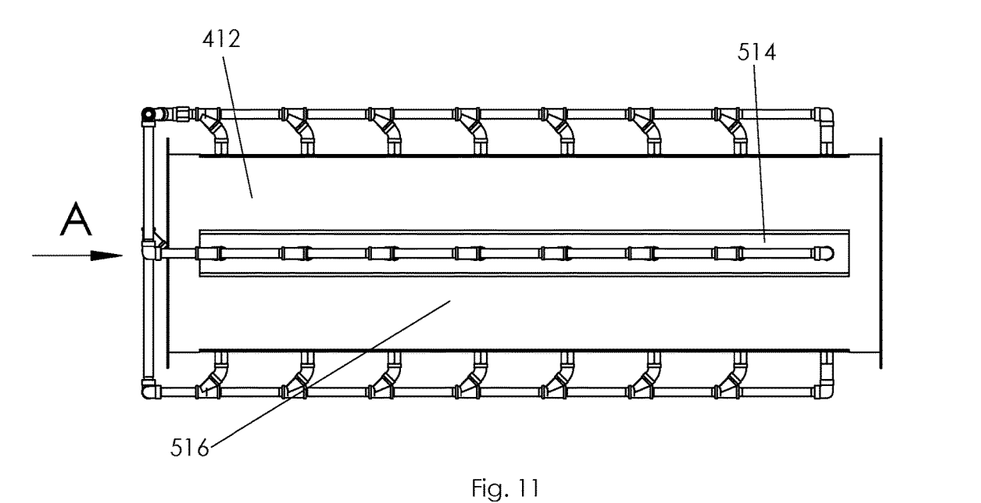
FIG. 11 is a side view of a steam assembly, in accordance with the present invention.
Figure 12:
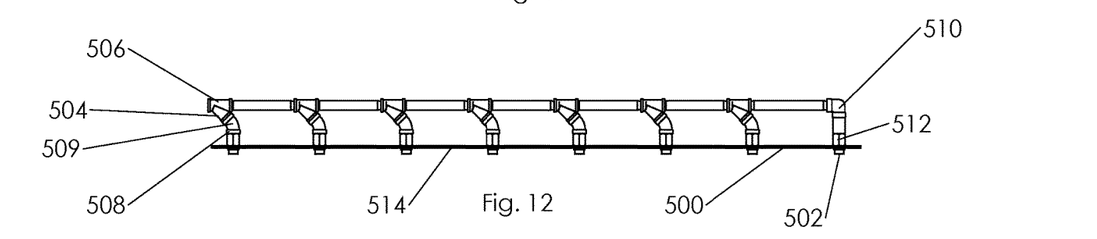
FIG. 12 is a side view of the steam assembly of FIG. 11 in accordance with the present invention.

A steam chamber 412 connects to the third duct 408 as shown in FIG. 10. The steam chamber 412, as shown FIGS. 11 and 12 are assembled as follows. A plate 500 will have eight steam nozzles 502 are equally spaced and attached on its bottom. Fitting 504 will consist of: a wye duct 506, a nipple 508, a 45° elbow 509, and a connector 512. Seven fittings 504 are assembled and secured onto the plate 500. The last steam nozzle 502 will be attached with connector 512, and elbow 510 connects to connector 512. The seven wye ducts 506 and one elbow 510 are connected with piping. This sub-assembly is steam assembly 514. The steam assembly 514, as shown in FIG. 12, consists of one plate 500, eight steam nozzles 502, seven fittings 504, one connector 512 and one elbow 510 with piping.

As shown in FIG. 11, the steam chamber 412 will have four steam assemblies 514 connected to duct 516. The four steam assemblies 514 will attached to the top, bottom, and each outer surface of duct 516. Or, from a front view FIG. 13, the four steam assemblies 514 will be positioned as follows: at the top outer surface of the duct 516 and 0°, and the rest equally spaced at 90° and on the outer surface of the duct 516.

Figure 13:
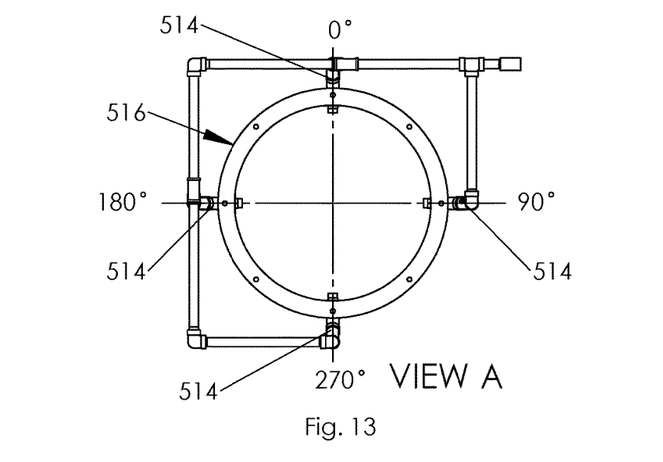
FIG. 13 is view A (front view) of FIG. 11, in accordance with the present invention.
Figure 14:
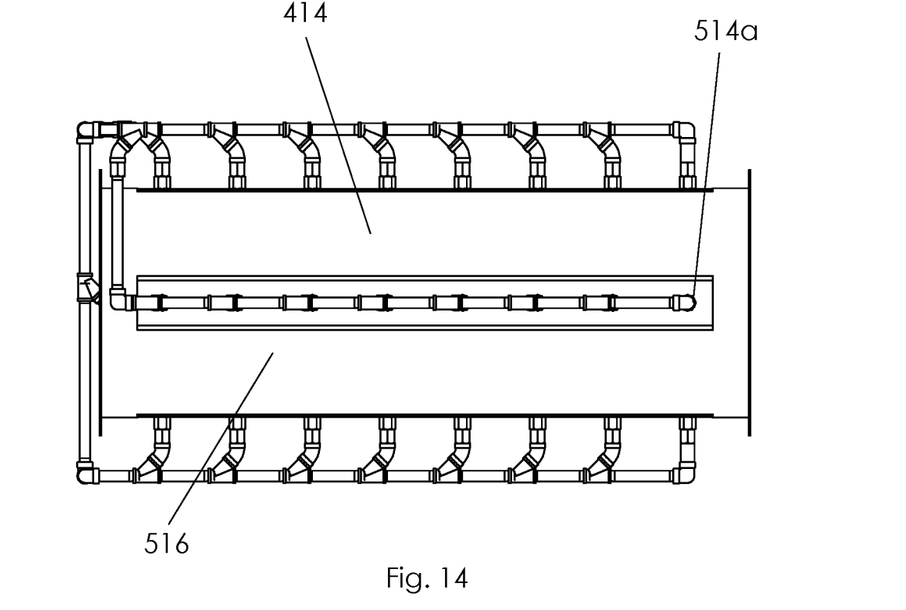
FIG. 14 is a side view of a mist assembly, in accordance with the present invention.
Figure 15:
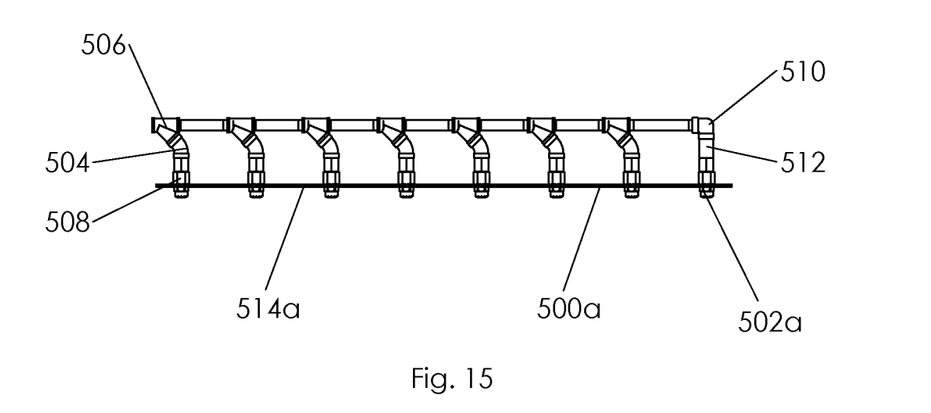
FIG. 15 is a side view of the mist assembly of FIG. 14 in accordance with the present invention.

As shown in FIG. 10, the fourth duct 408 connects to the rear end of steam chamber 412. Referring to FIGS. 14 and 15, a mist chamber 414 connects to the fourth duct 408. The mist chamber 414 will be assembled the same way steam chamber 412 was assembled and will use some of the same components. The mist chamber 414 is assembled as follows. A plate 500a will have eight mist nozzles 502a attached on its bottom, equally spaced. Fittings 504 are assembled over the plate 500a securing the seven mist nozzles 502a to plate 500a. The last mist nozzles 502a will be attached with connector 512, and elbow 510 connects to connector 512. The seven wye ducts 506 and one elbow 416 are connected with piping. This sub-assembly is a mist assembly 514a. The mist assembly 514a consists of a plate 500a, eight mist nozzles 502a, seven fittings 504, a connector 512 and an elbow 510 with piping. The mist chamber 414 will have four mist assemblies 514a fitted to duct 516. The four assemblies 514a will be positioned on the top surface of duct 516 at 0°, and the rest equally spaced at 90° and on the outer surface of duct 516, similar to FIG. 13.

As shown in FIG. 10 the fourth duct 408 connects to the rear end of mist chamber 414. A fifth duct 420 connects to the fourth duct 408. An extractor fan 316a connects to rear end of duct 420. A 45° elbow 418 connects to the rear end of the extractor fan 316a.

As shown in FIG. 3, a steam boiler 110 connects to the piping in steam chamber 412. The steam boiler 110 is fitted with elbow 112. A duct 116 is connected to elbow 112. A reducer duct 114 is connected to duct 116. The reducer duct 114 is inserted into the wye duct 406. A water pump 118 is connected to water tank 120. Piping is run from the water pump 118 to the steam boiler 110. A fuel pump 122 is connected to fuel tank 124. Piping is run from the fuel pump 122 to the steam boiler 110. The piping from steam boiler 110 connects to the steam fitting 518. The steam fitting 518 connects to the four steam assemblies 514 that are attached on the steam chamber 412.

The mist chamber 414 connects to a second water pump 118. The second water pump 118 is connected to water tank 120. The second water pump 118 connects to the mist fitting 518a. The mist fitting 518a connects to the four mist assemblies 514a that are attached on the mist chamber 414. Drain fitting 126 is connected to the bottom side of duct 420. Piping is fitted to the drain fitting 126 and ran to a third water pump 118. Piping is fitted and ran from the third water pump 118 to storage tank 120a.

Operation

The methods and systems will be described in detail with regard for the preferred embodiment. The embodiment is a methods and systems for removal of pollutants, smoke, exhaust and other gaseous pollutants that are released into the atmosphere. In general, when these pollutants occur, emission gases from the combustion reactions are released into the atmosphere. The systems and methods of the present invention will enclose the gaseous pollutants and transport them through a system of tubing and ductwork. The pollutants and gases are filtered through a filtration system; then mixed with steam; and then cooled with mist from the gaseous state to a liquid state, while disposing of the smoke clouds, exhaust, liquid and solid particulates that are in the pollutants.

In the preferred embodiment, a transport unit 100 is required. The transport unit 100 will be a special equipped helicopter or drone equipped to transport heavy loads with a large cargo area. In the preferred embodiment, a special equipped CH-53K helicopter is used for the transport unit as an example. The cabin area for this unit is 30 feet long, 9 feet wide and 6.5 feet tall. It can carry an external load of 27,000 pounds and a cargo load of 30,000 pounds.

As an illustration, a fire is burning and the smoke is rising and traveling eastward at an angle of 30 degrees with the earth surface. The transport unit 100 can be positioned over the pollutants and facing in the opposite direction. The transport unit will need to be at least 120 feet above the fire for safety. The transport unit 100 has an attachment of an exhaust hood 200 for the external load. The exhaust hood 200 is hovered over the rising pollutants and positioned at 30 degrees with its lowest point from the east.

For operation, winch 102 and winch 104 will support the exhaust hood 200 and winch 106 and winch 108 are for back-up in case of failure from winch 102 and/or winch 104, Referring to FIG. 3, when winch 102 and winch 104 are lowered to equal lengths, the exhaust will be horizontal or zero degrees and parallel with the earth's surface. In FIG. 1, the transport unit 100 is facing west and exhaust hood 200 is positioned at 30 degrees with the earth's surface.

The exhaust hood 200 can be positioned at any angle between 0° and 90° by lowering winch 104 lower than winch 102 or vice versa. In other words, the exhaust hood 200 can be positioned at any angle from the horizontal to a vertical position, with the horizontal position being 0° and the vertical position being at 90°. Reversing winches 102 and 104 enables the mirroring the direction. Winch 106 and winch 108 keep the same lengths as winch 102 or winch 104, with a little extra length in them to leave slack in their lines. FIG. 1 shows the exhaust hood 200 positioned at 30 degrees for an illustration only.

In the preferred embodiment, exhaust hood 200 is 50 ft. long and 57 ft. wide. It will come in different sizes when manufactured. The materials will be composed of high temperature sheets.

FIG. 5 is a bottom view of exhaust hood 200. Dome 202 is the bottom, exterior area of exhaust hood 200. Dome 202 has a unique shaped to trap the gaseous pollutants. Since hot gases rise, the exhaust hood 200 is disposed to hover over these pollutants and dome 202 encloses the hot gases and prevents them from escaping.

FIG. 7 illustrates how tubes 212, 214, 216, 218 are secured over each cut-out opening 203 of dome 202 and are attached to the tubing assemblies inside exhaust hood 200. The twelve hoods 204 and two middle parts 208 which have these tubing assemblies secured therein. These tubing assemblies are vacuum tubing, high temperature sheets to seal the gases entering them. The tubing assemblies are made to transport and export the gases enclosed in the dome 202.

The exhaust hood 200 is assembled by two mounting brackets 226 on the middle parts 208 of two hoods. Then, two swivel brackets 228 are mounted on each of the two, half hood-cylinders 206. The two halves hood-cylinders 206 are connected to the two hoods-middle part 208 by mounting the two swivel brackets 228 to the two brackets 226. The swivel brackets 228 enables the half hood-cylinders 206 to pivot on brackets 226, while keeping the two hoods-middle parts in a stationary position.

Exhaust hood mounting 300, as shown in FIG. 9, connects and fits over the nine elbows 222 on exhaust hood 200 and seals any pollutants from escaping. The tube-bend 302 is attached to exhaust mounting hood 300. The tube-bend 302 is made of flexible tubing that bends. The exhaust hood 200 can be positioned at any angles between 0° and 90°. The tube-bend 302 bends accordingly with the exhaust hood 200 and keeps an equivalent bend angle. The bottom half of tube-bend 302 is kept perpendicular to exhaust hood 200.

FIG. 5 shows exhaust hood 200 in an operating position shaped to trap the gaseous pollutants. It is within the terms of the present invention to place the exhaust hood 200 in a folded position as shown in FIG. 13, for example when the exhaust hood is being transported.

Figure 8:
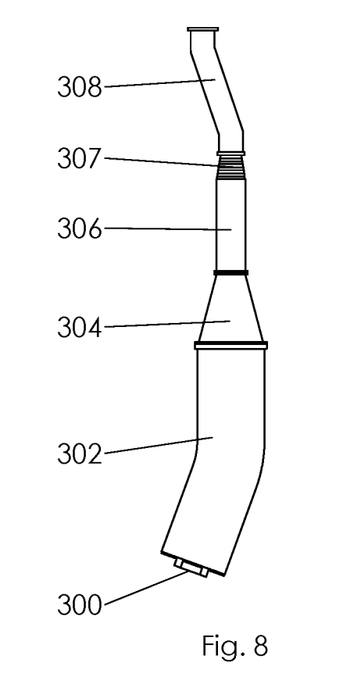
FIG. 8 is a side view of the tube extensions at their minimum reduction, in accordance with the present invention.

The tubing diameter of the system is reduced by connecting tube reducer 304 to the tube-bend 302. Gases flowing toward the reducer tube 304 where the flow is accelerated. Extension tube 306 is connected to the reducer tube 304. Extension tube 306 consist of 9 tubes 307 that slide up and down within one another. Each tube is fitted to the next tube and is fitted inside to outside and fitting from the first to the last one in sequential order. This allows extension tubes 306 to extend up and down without becoming detached from one another. Extension tube 306 will slide up or down whenever winches 102 and 104 cables are lowered or raised. FIG. 9 shows the tube extensions 306 at maximum extension and FIG. 8 shows tube extensions 306 at their minimum extension.

Upper tube 308 is connected to extension tube 306. A mounting plate 310 is the top mounting piece attached to the transport unit 100. The mounting plate 310 will have a hole cut out 311. The top part of upper tube 308 is inserted into the hole cut out 311 of the mounting plate 310. Mounting bracket 312 is positioned and secured over the top of the hole on mounting plate 310. The mounting bracket 312 secures the tubing assemblies that are attached to the mounting plate 310. The inside of the mounting bracket 312 is fitted to secure upper tube 308. The mounting bracket 312 can be opened to release upper tube 308 when not needed or for an emergency.

Fan-support 314 fits over mounting bracket 312. Extractor fan 316 fits over the fan-support 314. Extractor fan 316 has the capacity to pull all of the gases that are enclosed in the dome 202, all of the gases enclosed from the exhaust hood 200, and then pull all of the hot gases inside the vacuum tubing assemblies that are connected and associated with exhaust hood 200. After pulling the gases through extractor fan 316, the extractor fan 316 then pushes the gases forward through the duct systems that are attached to the hood.

A connector 400, as shown in FIG. 10, is mounted on extractor fan 316. The connector 400 is the connection fitting for the large tubing diameters to the smaller tubing diameters mounted to transport unit 100. Reducer elbow 402 fits over the connector 400 to begin the smaller tubing diameter assemblies. All of the gases and pollutants will be pushed into reducer elbow 402 from extractor fan 316. The purpose of the reducer elbow 402 is to transport the gases rising in a vertical flow to a horizontal flow, which in turn causes the velocity of the gas flow to accelerate. Duct 404 is connected to elbow reducer 402. The duct 404 is not quite horizontal. The tubing will have a slight incline downward from the front to rear, outside of the transport unit 100 for a downward flow. A wye duct 406 connects to duct 404.

The duct from steam boiler 110 connects to the inlet flow of the wye duct 406, as shown in FIG. 3. The steam boiler 110 is fitted with elbow 112. A duct 116 is connects to elbow 112. A reducer duct 114 is connected to duct 116. The reducer duct 114 is inserted into the wye duct 406.

The energy supply for steam boiler 110 is from fuel in this example. It can be run by electricity or by other means. The exhaust or by-products from the fuel burned in the steam boiler 110 are funneled through to the wye duct inlet 406. This will mix the emission gases from steam boiler 110 with the other pollutants passing through the systems three ducts 408.

The first of five ducts 408 is connected to wye duct 406. The attachments from the two filters 410 are connected between the three ducts 408. The filter 410 is a gas ceramic filter that filters the gaseous air pollutants and particulate matter, while allowing the remaining gases to flow through it. The filter 410 can be removed from its attachment. The two filters 410 can be used alternatively. When one is full of pollutants, it can be removed and the second filter 410 can be placed in its attachment and used.

A steam chamber 412 connects to the third duct 408. A steam and water supply is added. The steam boiler 110 will get its water supply from a water tank 120. A water pump 118 pumps water to the steam boiler 110 from water tank 120. The steam boiler 110 will get its fuel supply from fuel tank 124. A fuel pump 122 connects to fuel tank 124. The fuel pump 122 pumps fuel to steam boiler 110 from the fuel tank 124. The steam boiler 110 will produce the steam. Steam flows from the steam boiler 110 to steam fitting 518.

The steam fitting 518 connects to the steam chamber 412. The steam flows from steam boiler 110 to a steam fitting 518. The steam fitting 518 connects to the four steam assemblies 514 that are attached to the steam chamber 412. Steam will flow from the thirty two steam nozzles 502 inside of the steam chamber 412. The steam chamber will be flooded with steam. The chamber steam 412 will also act as a mixing chamber with the pollutants being pushed through it. The remaining emissions gases that passed through filter 410 will bond with the steam, a gaseous H2O. The steam, gases, and pollutants are mixed in this chamber. These gases are lighter than the air inside steam chamber 412.

The fourth duct 408 connects to the rear end of steam chamber 412. A mist chamber 414 connects to the fourth duct 408.

Another water supply is added. The mist chamber 414 will get its water supply from the water tank 120. A second water pump 118 pumps water from the water tank 120 to a mist fitting 518a. The mist fitting 518a connects to the four mist assembles 514a that are attached to the mist chamber 414. Fog, in a heavy mist, will flow from the thirty two mist nozzles 502a inside of the mist chamber 414. Mist chamber 414 is flooded with a misty fog. The mist chamber 414 will act as a mixing chamber with the fog, steam, gases, and pollutants being pushed through it. The gases mix and bond together inside mist chamber 414. After the remaining emissions gases bond with the steam, a gaseous H2O: these gases bond with the mist, a liquid H2O. The pollutants mixed with the steam and fog will cool. The pollutants and steam will turn from gaseous state to a liquid state after mixing with the fog. The remaining gaseous air pollutants will also liquefy. The liquids are now heavier than the air inside mist chamber 414 and will fall to the bottom surface of the vacuum tubing. The tubing will have a slight incline downward from the front to rear for a downward flow of the gases and liquids. This allows the liquid to flow downward that have fallen to the bottom surfaces of the tubing. The fourth duct 408 connects to the rear end of mist chamber 414. A duct 420 connects to the fourth duct 408.

When the gases go from a gaseous state to a liquid state, the liquid is heavier than the gases and the surrounding air. The liquid will fall to the bottom of the vacuum tubing. The vacuum tubing has a slight downward incline. The liquid will flow downward to the duct 420. The duct 420 have drain fitting 126 connected to it. The liquid will drain from the duct 420 into the drain fitting 126. From there, the liquid will drain from the drain fitting 126 to the third water pump 118. The liquid is pumped from the third pump 118 to the storage tank 120a.

As shown in FIG. 10, an extractor fan 316a connects to rear end of duct 420. A 45° elbow 418 connects to the rear end of the elbow to the fan extractor 316a. The extractor fan 316a pulls the gases and mist to it. Only mist, air, and minimal amounts of gases are released into the atmosphere from the 45° elbow 418. Practically all of the pollutants and steam have been condensed. The mist will dissipate when it is released in the atmosphere. The rotors from the transport unit 100 pushes and gravity pulls the mist, while it is dissipating, downward toward the earth's surface.

Conclusion, Ramifications, and Scope

As described hereinbefore, embodiments provide a systems and methods for capturing and removal of smoke, exhaust, and pollutants that are emitted into the atmosphere. Accordingly, the systems and methods provide a reliable resource for the elimination of these emission gases. The systems and methods are applicable to all aspects of where these occurrences take place such as disasters or natural causes.

In addition, the systems and methods of these embodiments result in the by-products, from these combustion reactions that are mixed with water, for storage that can be recycled.

While the above descriptions contain many specificities, these should not be construed as limitations on the scope, but rather as an exemplification of several embodiments thereof. The invention is capable of considerable modification, alteration, and equivalents. Accordingly, the scope should be determined not by the embodiments illustrated, but by the appended claims and their legal equivalents.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claimed is:

1. A system for the capturing and removal of gaseous pollutants that are released into the atmosphere, comprising:
    means for enclosing the gaseous pollutants that are released into the atmosphere;
    means for transporting the gaseous pollutants through tubing and ductwork;
    means for directing the gaseous pollutants through a filtration system;
    means for mixing the gaseous pollutants exiting the filtration system with steam in a steam chamber;
    means for cooling the gaseous pollutants mixed with steam exiting the filtration system with a mist to convert the gaseous pollutants being cooled from a gaseous state to a liquid state; and
    means for concurrently disposing of solid particulates that were in the gaseous pollutants;
    wherein the means for enclosing the gaseous pollutants comprises an exhaust hood supported by a transport unit; wherein the exhaust hood supported by the transport unit can be positioned over the gaseous pollutants, and wherein the bottom exterior surface of the exhaust hood can be faced in an opposite direction from the movement of the gaseous pollutants; and
    wherein the exhaust hood is supported by the transport unit such that the exhaust hood can be positioned at any angle between a horizontal position and a vertical position, with the horizontal position being 0° and the vertical position being at 90°.

2. The system of claim 1, wherein the exhaust hood is configured with the bottom exterior surface being shaped as a dome to trap the gaseous pollutants to prevent the gaseous pollutants from escaping.

3. The system of claim 2, wherein:
    the bottom exterior surface of the exhaust hood has a plurality of cut-out openings extending therethrough; and
    a tubing assemblies connected to the plurality of cut-out openings to receive the gaseous pollutants entering the exhaust hood, wherein each of the tubing assemblies is configured to export the gaseous pollutants enclosed in the exhaust hood to an exhaust port mounted to the exhaust hood.

4. The system of claim 3, further including:
    a bent tube attached to the exhaust port mounted to the exhaust hood; and
    wherein the bent tube is made of flexible tubing that bends such that the exhaust hood can be positioned at any angle between 0° and 90°.

5. The system of claim 4, wherein the tubing assemblies have a reduced diameter between a reducer tube and the bent tube whereby when gases flow toward the reducer tube from the bent tube the flow is accelerated.

6. The system of claim 5, wherein:
    the tubing assemblies include a plurality of extension tubes between the reducer tube and the bent tube; and
    further wherein the plurality of extension tubes are arranged in a telescoping arrangement.

7. The system of claim 6, wherein:
    the tubing assemblies include an upper tube connected to a mounting plate attached to the transport unit;
    an upper end of the upper tube of the tubing assemblies is inserted into an opening through the mounting plate; and
    the mounting plate secures the tubing assemblies that are attached to the transport unit.

8. The system of claim 7, wherein a fan-support fits over a mounting bracket and an extractor fan fits over the fan-support.

9. The system of claim 8, wherein the extractor fan is mounted to pull all of the gaseous pollutants that are enclosed in the exhaust hood, and then pull all of the hot gases inside the plurality of extension tubes that are connected and associated with exhaust hood.

10. The system of claim 9, wherein the extractor fan pulls all the gaseous pollutants from the exhaust hood and then pushes the gases pollutants forward through a duct system comprising a first duct and a second duct.

11. The system of claim 10, wherein the exhaust and by-products from fuel burned in a steam boiler are funneled through the duct system, wherein the duct system includes two attachments each having a respective filter therein wherein the two attachments are disposed between the first duct and the second the duct.

12. The system of claim 11, wherein the each respective filter in each of the two attachments is a gas ceramic filter.

13. The system of claim 12, further including water supply from a water tank and a water pump that pumps water from the water tank to the steam boiler, wherein the steam boiler is configured to direct steam to a steam fitting.

14. The system of claim 13, further including the steam fitting being connected to a steam chamber.

15. The system of claim 14, wherein:
    a third duct is connected between a rear end of the steam chamber and a mist chamber; and
    wherein the gaseous pollutants bond with steam in the mist chamber to liquefy the gaseous pollutants.

16. The system of claim 15, wherein:
    a drain fitting at the end of a fourth duct is configured to receive a flow of the liquefied gaseous pollutants.

17. The system of claim 16, wherein:
    the drain fitting directs the liquefied gaseous pollutants to a third water pump and then to a storage tank.

18. The system of claim 17, wherein a second extractor fan connects to a rear end of the fourth duct and is configured to be in fluid communication with the atmosphere.

* * * * *